United States Patent [19]

Pike

[11] 4,099,131
[45] Jul. 4, 1978

[54] FREE JET LASER AMPLIFIER

[75] Inventor: Charles T. Pike, Lexington, Mass.

[73] Assignee: Jersey Nuclear-Avco Isotopes, Inc., Bellevue, Wash.

[21] Appl. No.: 609,784

[22] Filed: Sep. 2, 1975

[51] Int. Cl.² .................... H01S 3/093; H01S 3/20
[52] U.S. Cl. .................... 330/4.3; 331/94.5 L; 331/94.5 P
[58] Field of Search .................. 330/4.3; 332/7.51; 331/94.5 C, 94.5 L, 94.5 P, 94.5 D

[56] References Cited

U.S. PATENT DOCUMENTS

| | | | |
|---|---|---|---|
| 3,688,216 | 8/1972 | Kocher et al. | 331/94.5 L |
| 3,740,665 | 6/1973 | Itzkan | 330/4.3 |
| 3,745,484 | 7/1973 | Caristi | 331/94.5 L |
| 3,810,040 | 5/1974 | Martin et al. | 330/4.3 |
| 3,814,507 | 6/1974 | Osborn | 331/94.5 D |
| 3,944,947 | 3/1976 | Pike et al. | 330/4.3 |

OTHER PUBLICATIONS

Varnado, "Degration in Long-Pulse Dye Laser. . .," 11/73, pp. 5067–5068, J. Appl. Phys., vol. 44, #11.
Itzka et al., "Oscillator-Amplifier Dye-Laser. . .G–257," 2/72, pp. 101–105, I.E.E.E. J. Q.R., vol. QE-8, #2.

*Primary Examiner*—Nelson Moskowitz
*Attorney, Agent, or Firm*—Weingarten, Maxham & Schurgin

[57] ABSTRACT

A free jet dye laser having a sheet of fluent laser material bounded along its edges by a pair of opposed guide members. An orifice injects the sheet of laser fluid into the region between the guide members where it flows towards a transparent portion of the guide members through which a beam of laser radiation to be amplified is directed. Pump excitation in the form of laser energy is applied through an exposed surface of the flowing laser material in the region between the transparent portions.

28 Claims, 5 Drawing Figures

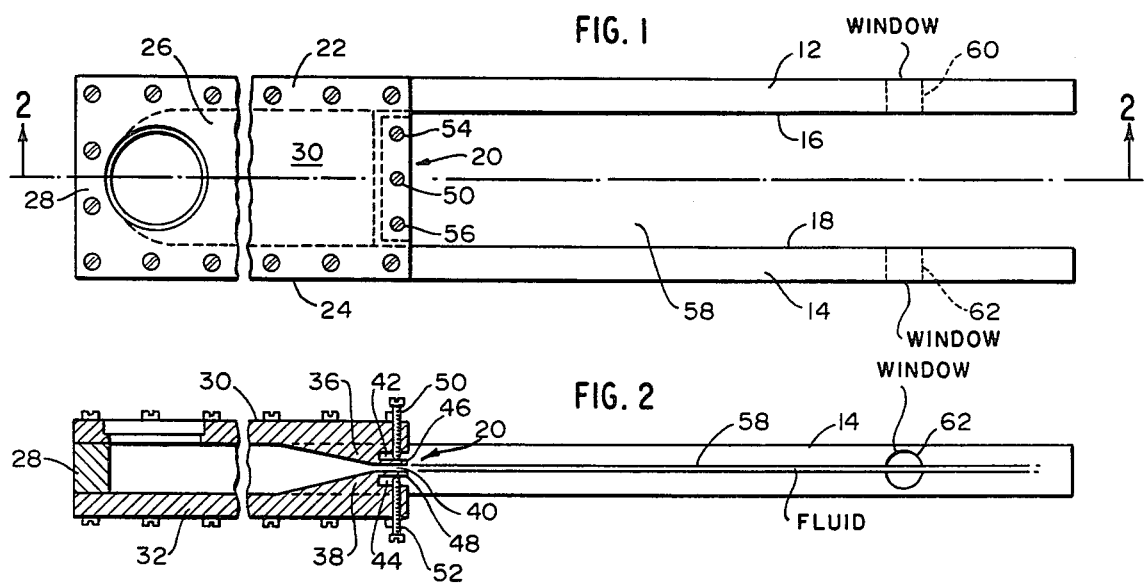
FIG. 1
FIG. 2
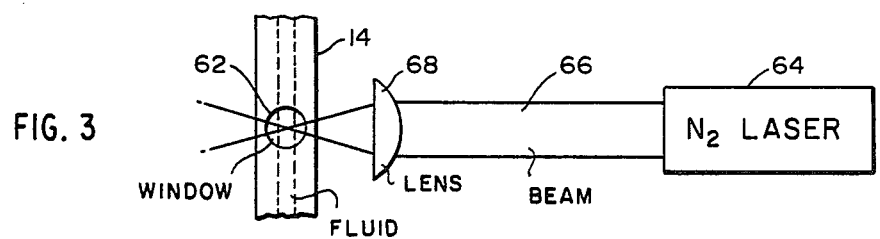
FIG. 3
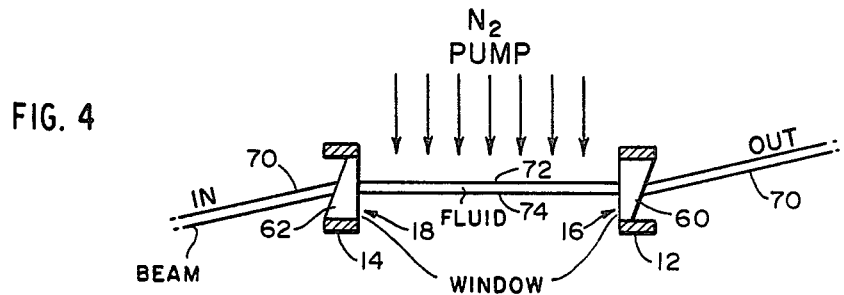
FIG. 4
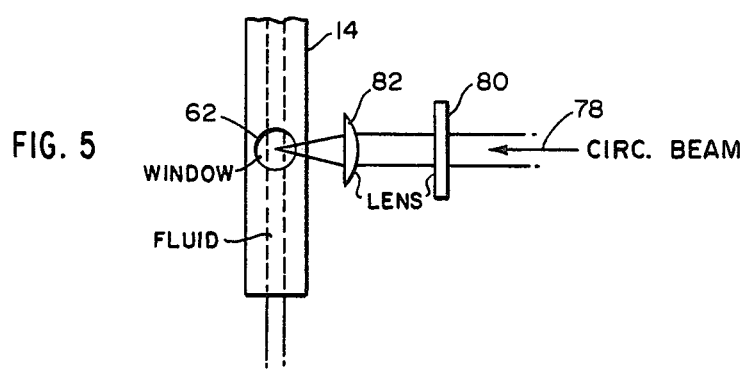
FIG. 5

FREE JET LASER AMPLIFIER

FIELD OF THE INVENTION

The present invention relates to laser amplifiers and in particular to a laser amplifier utilizing a free flowing laser medium.

BACKGROUND OF THE INVENTION

Utility of a tunable dye laser, wherein the lasing medium comprises a dye material in solution, to isotope separation has been recognized as, for example, in U.S. Pat. No. 3,772,519, incorporated herein by reference and assigned to the same assignee as the present application. For continuous operation of an isotope separation facility for uranium enrichment using the same or similar techniques as described there, it is desired to have pulsed beams of high intensity laser radiation operating on a generally continuous basis. This in turn requires that the laser systems operating to provide such beams be capable of operation for prolonged periods without degradation in beam quality or intensity. One source of degradation in laser performance over extended periods is associated with the windows that operate as a containment for the flowing dye medium and through which the excitation energy used in amplification is applied. Degradation at these points can result from solarization of the window material, i.e. gradual darkening or loss of transmissivity of the window, as well as a decomposition of the dye material on the inner surface of the window over time which would also reduce the window transmissivity and contribute to a loss of efficiency and promote unwanted heating. The containment walls will also produce a boundary layer effect leading to inefficient heat removal in the flowing medium.

It has been suggested in order to overcome this and other difficulties in laser amplifiers to employ a totally free jet in which there is no boundary layer between the jet and a containment vessel in the region of laser amplification.

BRIEF SUMMARY OF THE INVENTION

In accordance with the teaching of the present invention, a free jet dye laser is described in which a sheet of flowing dye medium is not totally free, but is directed between a pair of opposed guide walls which provide lateral containment of the sheet past a pair of windows through which the laser radiation to be amplified is passed. The flowing sheet of dye medium is transversely pumped by laser or other radiation applied onto the free surface to eliminate the problems inherent in pumping through an interface between the dye medium and a pump excitation window. The flowing sheet is configured by an adjustable orifice to provide a substantially uniform cross-section for the dye medium between the windows through which the laser beam to be amplified passes. Optical quality of the amplified laser beam is assured by this uniformity of cross-section along with the use of rigid windows for transmitting the beam through the amplifying medium.

BRIEF DESCRIPTION OF THE DRAWING

These and other features of the present invention are more fully described below in the detailed description of the preferred embodiment, presented for purposes of illustration and not by way of limitation, and in the accompanying drawing of which:

FIG. 1 is a side view of a free jet dye laser assembly according to the present invention;

FIG. 2 is a sectional side view of the assembly of FIG. 1;

FIG. 3 is a schematic diagram and side view of one embodiment of pumping apparatus for use in the laser amplifier assembly of FIG. 3;

FIG. 4 is an end sectional view of the laser amplifier according to the present invention showing the paths of the amplified beam and excitation radiation; and FIG. 5 is a schematic diagram and side view of an alternative pumping system for the laser medium of the present invention.

DETAILED DESCRIPTION OF THE PREFERRED EMBODIMENT

The present invention contemplates a laser, preferably a laser amplifier, having a transversely pumped flowing sheet of laser medium that is guided along the thin sheet edges but is free of containment walls along the pumped surface to avoid problems associated with the interface between a pump window and the flowing laser medium without compromise in beam quality. Such a laser amplifier is of particular utility in laser enrichment of the fissionable isotope of uranium, U-235. Lasers are desired for this application which provide a high intensity, high pulse rate laser beam of high optical quality to permit its utilizaton over an extended beam length of many meters. Where continuous enrichment operation is desired, the laser amplifiers must be designed to achieve high intensity amplification without degradation in beam quality or energy for extended periods of time. Commonly encountered problems which limit the running time of high power laser amplifiers include the gradual darkening of the window through which pumped excitation is applied to the lasing medium for the purpose of amplification of an input beam. This effect gradually reduces the amount of excitation energy available within the medium for amplification of the beam and contributes significantly to heating of the entire amplifier apparatus. Additionally, gradual accumulations of decomposed dye occur at the interface between the pump window and the lasing fluid to further reduce the efficiency of the system, and the interface between the rapidly flowing dye medium and the containment walls for the amplifier cell creates a fluid dynamic boundary layer which results in thermal distortion of the laser medium.

FIG. 1 illustrates an exemplary cell for a free jet dye laser which overcomes these difficulties.

The form of the invention in FIG. 1 is illustrative of a free jet laser having an exposed, pumped surface in combination with a guide member to either side of the jet. It is intended that the structure and dimensions shown below be viewed as typical only, wide latitude in absolute and relative dimensions being intended.

This exemplary form includes first and second extended arms 12 and 14 having facing surfaces 16 and 18 which are shown to be in parallel facing relationship. The arms 12 and 14 may be metallic such as of stainless steel. A condition of parallel surfaces is not required. The arms 12 and 14 extend to an orifice 20 and beyond to form boundary walls 22 and 24 for a plenum 26 into which the lasing medium is applied. The plenum 26 is furhter bounded by a portion 28 which couples the sections 22 and 24 of the arms 12 and 14 and by top and bottom plates 30 and 32. An aperture 34 in the top plate 30 admits the laser medium, typically a lasable dye in a solvent such as ethylene glycol, to the plenum 26 from which it is forced through the orifice 20. The ethylene glycol contributes to a low Reynolds number to maintain sheet uniformity.

The orifice 20, as is more clearly shown in sectional view in FIG. 2, is formed by converging portions 36 and 38 of the top and bottom plates 30 and 32 leaving a narrow channel 40, 0.8 millimeters in separation and two inches in length in the example of the drawing, between the arms 12 and 14. Preferably, to provide an adjustment in the width of the opening in the orifice 20, portions 42 and 44 of the converging sections 36 and 38 have been milled from the portions 36 and 38 leaving narrow lips 46 and 48 separating the orifice opening from the milled grooves 42 and 44. Adjustment screws 50 and 52, which may be one or many, are threaded through the top and bottom plates 30 and 32 and extended into contact with the lips 46 and 48 to narrow the separation of the lips. In the preferred embodiment of FIGS. 1 and 2, a set of three screws 50, 54 and 56 are provided in the top plate 30 and a set of matching screws, two to either side of the screw 52, in the bottom plate 32. The adjusting screws permit narrowing of the opening of the orifice in the center with a prescribed contour to control the downstream cross-sectional area of the flowing medium, preferably to provide as near parallel surfaces as is possible at the point of amplification.

Laser medium pumped under pressure through the channel 40 in the orifice 20 is directed between the arms 12 and 14 as a jet 58 which contacts the surfaces 16 and 18 to establish the general form of a sheet of flowing dye solution where it passes windows 60 and 62, typically optical quartz, placed through the arms 12 and 14 a distance from the orifice 20. The windows 60 and 62 in the exemplary configuration of FIG. 1 are preferably, but not necessarily, placed down arms 12 and 14 approximately five times the separation of the arms 12 and 14 at the orifice. The edges of the jet 58 flow along the facing surfaces 16 and 18 of the arms 12 and 14 and continue across the inward surfaces of the windows 60 and 62. The jet 58 thereafter is expelled from the arms 12 and 14 to collection means which may be employed for recirculating the lasing medium back to the plenum 26 typically with the removable of heat generated by the excitation of the lasing medium of the jet 58 to produce laser amplification.

As is illustrated in FIG. 3, laser excitation is applied to produce transverse pumping of the portion of the jet 58 between the windows 60 and 62. As shown in FIG. 3, typical excitation is provided from a nitrogen laser 64 which may have or be given a laser output beam 66 with a rectangular cross-section having typically the long dimension corresponding to the separation of the windows 60 and 62. The short cross-sectional dimension of the beam 66 is converged by a cylindrical lens 68 to a focus or near focus within the jet 58 directly between the windows 60 and 62 to concentrate the pumping energy from the nitrogen laser 64 in the region of amplification between the windows 60 and 62. The laser 64 is typically a pulsed laser of high repetition rate and may include commercial lasers such as is available from the Avco Everett Research Laboratory, Inc. in Everett, Mass.

As is illustrated in FIG. 4, a laser beam 70 is applied to the jet 58 for amplification through the window 62. The beam 70 is preferably applied at Brewster's angle for the polarization within the beam 70 in order to eliminate reflections by the window 62. The beam 70 traverses the jet 58 which acts in a manner similar to a wave guide for the radiation in beam 70, reflecting it from the unbounded surfaces 72 and 74 of the jet 58. The beam 70 is typically the output of a tunable dye laser oscillator or amplifier and is limited in frequency and bandwith to correspond to an absorption line for a particular isotope, such as the U-235 isotope of uranium, in a mixture of isotopes.

The amplified beam 70 exits the region of amplification through the opposite window 60, also at Brewster's angle, for utilization or further amplification as is desired.

The windows 60 and 62 are typically of an optical quality quartz to maintain the high beam quality in the input beam 70 for extended beam lengths in the amplified output without excessive divergence. The use of ethylene glycol as a solvent for the dye in the jet 58 facilitates maintaining a nearly plane relationship for the jet surfaces 72 and 74 as an aid in maintaining beam quality.

The adjustment of the adjusting screws for the orifice 20 to provide the optimum beam quality in the output beam 76 may be according to the technique illustrated in U.S. patent application Ser. No. 581,648, filed May 28, 1975, incorporated herein by reference in which the use of such adjustment is illustrated. Briefly, such a system operates by directing a coherent beam of laser radiation through the jet 58 along the trajectory of the input beam 70 through a converging lens to a pinhole, with the image of the undeviated rays from the jet 58 viewed on a ground glass screen. Optimal beam quality is obtained by adjusting the screws for a maximum line width on the viewing screen.

An alternative pumping system for the laser amplifier of the present invention is illustrated in FIG. 5. As shown there, an input beam 78 of circular cross-section is converted to a narrow elongate cross-section of the point where it is within the portion of the jet 58 between the windows 60 and 62. For this purpose, a set of cylindrical lenses 80 and 82 are set with their cylindrical axes orthogonal to each other and in tandem along the direction of beam 78.

As can be seen from the above description, the pumped surface of the lasing medium is totally free of containment windows which can shorten the uninterrupted use of the laser before replacement or cleaning of critical parts must be effected. The preferred embodiment described above to accomplish this improvement has been shown as an exemplary system only, the actual scope of the invention being defined in the following claims.

What is claimed is:

1. A free jet laser amplifier comprising:
   first and second guide members each having a surface for bounding a flowing sheet of laser medium;
   said guide members having each a transparent portion;
   a beam of radiation to be amplified applied to one of said transparent portions;
   an orifice positioned between said first and second guide members and having an elongate opening with the long dimension oriented toward the surfaces of said guide members;
   a fluid laser medium flowing through the opening of said orifice to provide a flowing sheet of laser medium bounded solely at its edges by the surfaces of said first and second guide members and extending across the transparent portions of said first and second guide members; and excitation radiation applied to the flowing sheet of laser medium through an exposed surface thereof in the region between the transparent portions of said first and second guide members.

2. The laser amplifier of claim 1 wherein the surfaces of said first and second guide members are substantially plane and parallel to each other.

3. The laser amplifier of claim 1 wherein the distance from said orifice to the transparent portion where said beam is applied is approximately five times the distance between the surfaces of said first and second guide members at said orifice.

4. The laser amplifier of claim 3 wherein the separation of the surfaces of said first and second guide members is approximately 2 inches.

5. The laser amplifier of claim 1 wherein said guide members comprise metallic arms and said transparent portion comprises first and second windows in said metallic arms at the point of application of said beam of radiation to be amplified.

6. The laser amplifier of claim 5 wherein said windows include quartz prisms having an external face angled to said beam of radiation to be amplified generally at Brewster's angle.

7. The laser amplifier of claim 1 wherein means are provided to adjust the width of opening of said orifice across the dimension of said orifice between the surfaces of said first and second guide members.

8. The laser amplifier of claim 7 wherein:
the opening of said orifice is defined by first and second lip portions confining the flow of laser medium through said orifice between the surfaces of said first and second guide members; and
said adjusting means includes means for urging said lip portions toward each other.

9. The laser amplifier of claim 8 wherein said adjusting means are adjusted to provide a spacing between said lip portions which is generally narrower in the center of the opening between the facing surfaces of said first and second guide members.

10. The laser amplifier of claim 1 wherein said beam of radiation to be amplified comprises a beam of laser radiation limited in frequency to an absorption line for a selected isotope in a mixture of isotopes.

11. The laser amplifier of claim 10 wherein said absorption line is an absorption line for the U-235 isotope of uranium.

12. The laser amplifier of claim 11 wherein said beam of radiation to be amplified includes the output of a dye laser.

13. The laser amplfier of claim 1 further including means for focusing said excitation radiation to a narrow elongated region between said transparent portions.

14. The laser amplifier of claim 13 further including:
means for generating a beam of laser radiation having a rectangular cross-section with a long dimension thereof generally corresponding to at least the distance between the surfaces of said first and second guide members in the region of the transparent portions; and
means for converging the beam of laser radiation along the short dimension of rectangular cross-section to a focus in the region of laser medium between the transparent portions of said first and second guide members.

15. The laser amplifier of claim 14 wherein said means for providing a laser beam of rectangular cross-section includes a nitrogen laser.

16. The laser amplifier of claim 1 further including:
means for generating a beam of laser radiation having a generally circular cross-section; and
means for focusing said beam of circular cross-section to a narrow elongate region within said laser medium with the elongate dimension extending between the transparent portions of said first and second guide members.

17. The laser amplifier of claim 16 wherein said focusing means comprise first and second cylindrical lenses placed in tandem in the path of the laser beam of generally circular cross-section and oriented with the cylindrical axes orthogonal to each other.

18. The laser amplifier of claim 1 wherein said medium includes a dye solution.

19. The laser amplifier of claim 18 wherein said dye solution includes ethylene glycol.

20. The laser amplifier of claim 18 further including:
a plenum of dye solution communicating with said orifice to supply said flowing fluid medium from said orifice.

21. The laser amplifier of claim 20 further including:
first and second containment walls for said plenum; and
inwardly converging portions of said first and second containment walls which define said orifice.

22. The laser amplifier of claim 21 further including:
means associated with said inwardly converging portions for adjusting the contour of said orifice.

23. A cell for a fluid laser medium comprising:
first and second guide members arranged to present a surface of each facing each other;
an orifice having a long dimension to the opening thereof oriented toward the facing surfaces of said first and second guide members;
a plenum communicating with said orifice for providing a fluid laser medium to said orifice;
said orifice oriented to direct the fluid laser medium from said plenum along and between the facing surfaces of said first and second guide members;
the facing surfaces of said guide members extending substantially beyond the path of contact with the fluid medium in a direction transverse to said orifice long dimension whereby the directed laser medium is contacted only at its edges by said facing surfaces; and
first and second transparent portions in said first and second guide members in the path of fluid laser medium directed along the surfaces of said first and second guide members.

24. The cell of claim 23 wherein:
the opening of said orifice in the short dimension thereof is narrower inwardly of the guide members than at the guide members.

25. The cell of claim 23 wherein:
said first and second transparent portions include windows set in said first and second guide members respectively.

26. The cell of claim 23 wherein said first and second transparent portions are located from said orifice along said first and second guide members approximately five times the long dimension of said orifice between said guide members.

27. The cell of claim 23 wherein the long dimension of said orifice extends the entire distance between said facing surfaces.

28. The laser amplifier of claim 1 wherein the long dimension of said orifice extends the entire distance between said surfaces of said first and second guide members.

* * * * *